(12) United States Patent
Bialic et al.

(10) Patent No.: US 9,544,053 B2
(45) Date of Patent: Jan. 10, 2017

(54) OPTIMIZING THE RATE IN A LI-FI SYSTEM

(71) Applicant: Commissariat a l'energie atomique et aux energies alternatives, Paris (FR)

(72) Inventors: Emilie Bialic, Meyzieu (FR); Dinh-Chuong Nguyen, Grenoble (FR); David Vaufrey, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/704,407

(22) Filed: May 5, 2015

(65) Prior Publication Data
US 2015/0349884 A1    Dec. 3, 2015

(30) Foreign Application Priority Data

May 7, 2014 (FR) .................................. 14 54140

(51) Int. Cl.
*H04B 10/116* (2013.01)
(52) U.S. Cl.
CPC .................. *H04B 10/116* (2013.01)
(58) Field of Classification Search
CPC .................................................. H04B 10/116
USPC .................................................. 398/118, 172
See application file for complete search history.

(56) References Cited

U.S. PATENT DOCUMENTS

| | | | | |
|---|---|---|---|---|
| 8,330,379 B2* | 12/2012 | Schenk | ........... | H05B 37/02 315/150 |
| 2005/0168168 A1* | 8/2005 | Elliott | ........... | H05B 33/0818 315/247 |
| 2010/0013396 A1* | 1/2010 | Peng | ........... | H05B 37/0263 315/192 |
| 2013/0307428 A1* | 11/2013 | Hattrup | ........... | H05B 33/0812 315/201 |
| 2014/0072310 A1* | 3/2014 | Yang | ........... | H05B 33/0845 398/118 |
| 2014/0120702 A1 | 5/2014 | Vaufrey et al. | | |
| 2015/0102733 A1* | 4/2015 | Knapp | ........... | H04L 12/40045 315/152 |
| 2015/0280820 A1* | 10/2015 | Breuer | ........... | H04B 10/116 398/128 |

FOREIGN PATENT DOCUMENTS

KR    10-2008-0064425    7/2008

OTHER PUBLICATIONS

U.S. Appl. No. 14/762,660, filed Jul. 22, 2015, Vaufrey.
(Continued)

*Primary Examiner* — Dalzid Singh
(74) *Attorney, Agent, or Firm* — Oblon, McClelland, Maier & Neustadt, L.L.P.

(57) ABSTRACT

The invention relates to a method for optimizing the data rate, in a wireless communication system comprising a LED forming an emitting device, and a photodetector forming a receiving device. For a given value of a DC component of the supply signal of the LED, the modulation amplitude of an AC component of this supply signal is adjusted step by step, so as to improve the transmission quality of the signal provided by the LED and received by the photodetector. The invention also relates to an optimization module implementing such a method. Alternatively, the modulation amplitude of the AC component of the supply signal is set, and the value of the DC component is adjusted step by step.

16 Claims, 8 Drawing Sheets

(56) References Cited

OTHER PUBLICATIONS

French Preliminary Search Report issued Feb. 10, 2015 in French Application 14 54140 filed on May 7, 2014 (with English Translation of Categories of Cited Documents).
Hyuk-Choon Kwon, et al., "Modulation Categorization of Visible Light Communication", IEEE Draft, vol. 802.15, No. 1, 2008, 12 pgs.
Kang-Il Ahn, et al., "Capacity Analysis of M-PAM Inverse Source Coding in Visible Light Communications", Journal of Lightwave Technology, vol. 30 (10), 2012, pp. 1399-1404.
Sang Hyun Lee, et al., "Multilevel Transmission in Dimmable Visible Light Communication Systems", Journal of Lightwave Technology, vol. 31 (20), 2013, pp. 3267-3276.

* cited by examiner

OPTIMIZING THE RATE IN A LI-FI SYSTEM

TECHNICAL FIELD

The present invention relates to the field of optimizing the data rate, within the scope of a communication system wherein the information is encoded in a light signal located in the visible part of the electromagnetic spectrum. Such a communication system is commonly called Li-Fi.

STATE OF PRIOR ART

In prior art, Li-Fi communication systems are known comprising a LED forming emitting means, and a photodetector forming receiving means. The LED provides a light signal in the visible range (generally between 400 nm and 800 nm). This signal is intensity-modulated, which allows information transmission.

Such a communication system is particularly advantageous in that LEDs of pre-existing lighting systems can be used as emitting means. The LED then provides a light signal wherein two components can be identified: a DC component, ensuring a lighting function, and an AC component the variations of which will be imperceptible to the human eye and ensuring a data transmission function.

The LEDs commonly used to combine lighting and data transmission functions are LED emitting a white light. For example, a LED emitting a blue light, associated with a phosphor layer which absorbs part of the blue light signal and emits a yellow light signal in response is used. The signal finally emitted is the sum of a blue signal and a yellow signal, that is white light. A set of four LEDs emitting in the red, green, blue, and orange spectra respectively can also be used, the total light signal corresponding to white light.

Rates reachable using a Li-Fi communication system are theoretically in the order of one Gbit/s, under given conditions (802.11n standard for example), that is about 10 times more than the rate of a Wi-Fi communication system. Numerous works focus on optimizing this rate.

For example, Li-Fi communication systems have been suggested, comprising collimation optics, enabling the luminous flux received by the photodetector to be optimized. Other works have suggested to optimize this rate in relation to a phosphor layer LED. The absorption and emission phenomenon by the phosphor is slow in comparison with the response time of the blue LED. The flow rate can be improved by using only the blue light signal for data transmission.

One purpose of the present invention is to provide a method enabling data transmission rates reachable using a Li-Fi communication system to be further improved.

Another purpose of the present invention is to provide a device for implementing such a method.

DISCLOSURE OF THE INVENTION

This purpose is achieved with a first method for optimizing the data rate, in a wireless communication system comprising a light-emitting diode forming emitting means, said light-emitting diode being supplied by a supply signal comprising a DC component and an AC component.

The first method according to the invention comprises the following steps of:
  setting a value of the DC component of the supply signal;
  adjusting a modulation amplitude of the AC component of the supply signal, from a measurement of a so-called useful parameter, representative of the transmission quality of a so-called useful signal, the useful signal corresponding to a light signal emitted by the light-emitting diode and received by a photodetector forming receiving means of the wireless communication system.

Preferably, adjusting is made by successive increments.

The parameter representative of the transmission quality of the useful signal can be a signal-to-noise ratio or a bit error rate or a packet error rate or a frame error rate.

According to a first embodiment, adjusting a modulation amplitude comprises the following steps:
  an initial step of measuring the values of the useful parameter obtained for an initial modulation amplitude, for this initial modulation amplitude plus a modulation amplitude increment, and for this initial modulation amplitude minus said increment;
  searching for the value of the useful parameter corresponding to the best transmission quality of the useful signal, among said values of the useful parameter which are measured, called a local extremum;
  when this local extremum does not correspond to the initial modulation amplitude, continuing adjusting, by increasing the modulation amplitude if the local extremum corresponds to the initial modulation amplitude plus said increment, or by decreasing the modulation amplitude if the local extremum corresponds to the initial modulation amplitude minus said increment.

According to a second embodiment, the first method according to the invention comprises a step of comparing the DC component of the supply signal with a first reversal value separating two behaviours of the light-emitting diode:
  a first behaviour such that the evolution of the value of the useful parameter reflects an improvement in the transmission quality of the useful signal, when the modulation amplitude increases; and
  a second behaviour such that the evolution of the value of the useful parameter reflects a decrease in the transmission quality of the useful signal, when the modulation amplitude increases.

Preferably, adjusting the modulation amplitude according to this second embodiment implements at least one positive or negative increment according to whether the light-emitting diode has the first or the second behaviour.

The first method according to this second embodiment of the invention can comprise an initial step of determining the first reversal value.

Determining the first reversal value can implement measurements of impedance spectra of the light-emitting diode, for different values of the DC component of the supply signal, the first reversal value separating two behaviours of the light-emitting diode:
  a first behaviour such that the radius of the impedance spectrum increases with the modulation amplitude; and
  a second behaviour such that the radius of the impedance spectrum increases when the modulation amplitude decreases.

Alternatively, determining the first reversal value can implement searching for the point of intersection of several curves representing the equivalent resistance of the light-emitting diode as a function of the DC component of its supply signal.

According to another alternative, determining the first reversal value can implement searching for a point of inflexion on a curve representative of the logarithm of the intensity of the current flowing through the light-emitting diode as a function of a supply DC voltage.

The invention also relates to a second method for optimizing the data rate, in a wireless communication system comprising a light-emitting diode forming emitting means, said light-emitting diode being supplied with a supply signal comprising a DC component and an AC component.

The second method according to the invention comprises the following steps of:
- setting a modulation amplitude of the AC component of the supply signal; and
- adjusting the DC component of the supply signal, from a measurement of a so-called useful parameter, representative of the transmission quality of a so-called useful signal, the useful signal corresponding to a light signal emitted by the light-emitting diode and received by a photodetector forming receiving means of the wireless communication system.

The invention also relates to a first optimization module suitable for implementing the first method according to the invention, and comprising:
- an intensity controller, arranged to set the value of the DC component of the supply signal of the light-emitting diode;
- signal processing means, suitable for measuring the value of the useful parameter;
- control means, arranged to modify the modulation amplitude of the AC component of the supply signal of the light-emitting diode; and
- adjusting means receiving as an input, the value of the useful parameter, and driving the control means to modify the modulation amplitude, so as to modify the value of the useful parameter for the purpose of improving the transmission quality of the useful signal.

Advantageously, the first module according to the invention further comprises means for comparing the DC component of the supply signal of the light-emitting diode with a first reversal value separating two behaviours of the light-emitting diode:
- a first behaviour such that the evolution of the value of the useful parameter reflects an improvement in the transmission quality of the useful signal, when the modulation amplitude increases; and
- a second behaviour such that the evolution of the value of the useful parameter reflects a decrease in the transmission quality of the useful signal, when the modulation amplitude increases.

The invention also relates to a first wireless communication system comprising a light-emitting diode forming emitting means, a photodetector forming receiving means, said light-emitting diode being supplied by a supply signal comprising a DC component and an AC component, and a first optimization module according to the invention.

The invention also relates to a second optimization module suitable for implementing the second method according to the invention, and comprising:
- a modulation amplitude controller, arranged to set the modulation amplitude of the AC component of the supply signal of the light-emitting diode;
- signal processing means, suitable for measuring the value of the useful parameter;
- control means, arranged to modify the DC component of the supply signal of the light-emitting diode; and
- adjusting means receiving, as an input, the value of the useful parameter, and driving the control means to modify the DC component of the supply signal, so as to modify the value of the useful parameter for the purpose of improving the transmission quality of the useful signal.

The invention finally relates to a second wireless communication system comprising a light-emitting diode forming emitting means, and a photodetector forming receiving means, said light-emitting diode being supplied with a supply signal comprising a DC component and an AC component, and a second optimization module according to the invention.

BRIEF DESCRIPTION OF DRAWINGS

The present invention will be better understood upon reading the description of exemplary embodiments given by way of purely indicating and in no way limiting purposes, making reference to the appended drawings wherein.

DETAILED DISCLOSURE OF PARTICULAR EMBODIMENTS

First, the observations underlying the present invention will be illustrated.

Figure 1:
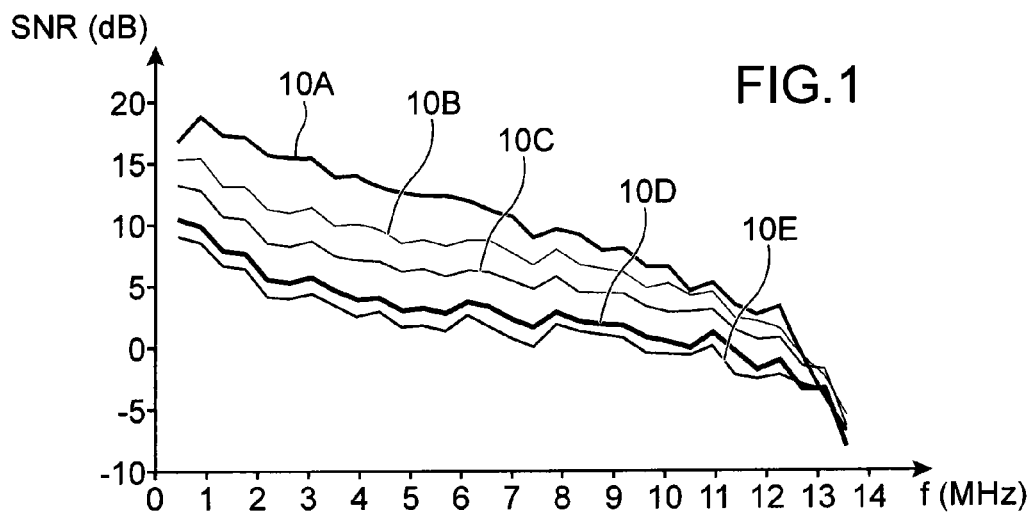
FIG. 1 illustrates curves of the signal-to-noise ratio as a function of the frequency, in a Li-Fi communication system, for different modulation amplitudes of the AC component of the supply voltage of a LED, and for a first value of the DC component of said supply voltage.

FIG. 1 illustrates signal-to-noise ratio curves (in dB) as a function of the frequency (in MHz), for an electrical signal corresponding to the light signal emitted by a LED and received by a non-saturated photodetector placed at 1.5 cm from the LED. The signal-to-noise ratio is designated by the acronym SNR.

To each curve corresponds a modulation amplitude value of the AC component of the supply voltage of the LED. This is more simply also called the modulation amplitude of the supply voltage of the LED. The modulation amplitude is defined herein as being half the peak-to-peak amplitude of the modulated signal.

All the curves correspond to a same value of the DC component of this supply voltage. The DC component of the supply voltage is also known as a polarization voltage, or bias voltage. The DC component is herein 2.50 V.

The signal which is superimposed with the bias voltage is a zero average modulation forming the AC component of the supply voltage of the LED. This is an OFDM (Orthogonal Frequency-Division Multiplexing) type modulation, suitable for Li-Fi (unipolar real signal). The AC component of the supply voltage is herein made from 31 sub-carriers distributed on a 14 MHz band.

By considering the curves from top to bottom, they respectively correspond to a modulation amplitude of 0.05 V (curve 10A); 0.10 V (curve 10B); 0.15 V (curve 10C); 0.25 V (curve 10D); 0.35 V (curve 10E). Thus, it can be seen that for this value of the DC component of the supply voltage, the signal-to-noise ratio increases when the modulation amplitude decreases.

It is assumed for example that a signal-to-noise ratio higher than or equal to 7 dB is required in order to perform a reliable decoding (typically with a bit error rate lower than $10^{-4}$). The curve 10A assumes values higher than or equal to 7 dB for all the frequencies lower than about 10 MHz. For a spectral efficiency equal to 2 bits/Hz/s, this corresponds to a total rate of 20 Mbits/s. The curve 10E assumes values higher than or equal to 7 dB only for frequencies lower than about 2 MHz. For a spectral efficiency equal to 2 bits/Hz/s, this corresponds to a total rate of 4 Mbits/s. Thus, the higher the signal-to-noise ratio, the higher the rate.

Figure 2:
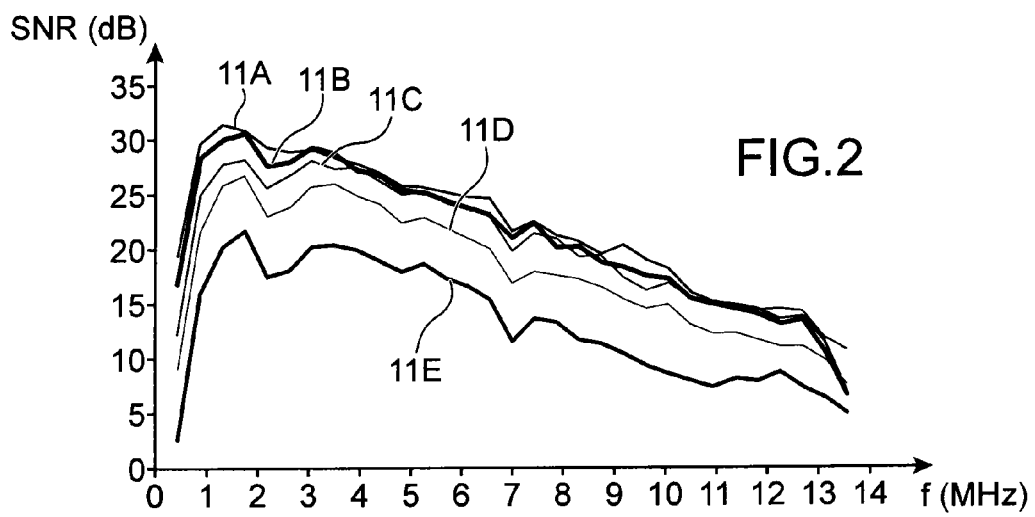
FIG. 2 corresponds to FIG. 1, and for a second value of said DC component.

FIG. 2 corresponds to FIG. 1, except that the DC component of the supply voltage is equal to 2.70 V.

By considering the curves from top to bottom, they respectively correspond to a modulation amplitude of 0.35 V (curve 11A); 0.25 V (curve 11B); 0.15 V (curve 11C); 0.10 V (curve 11D); 0.05 V (curve 11E). Thus, it can be seen that for this value of the DC component of the supply voltage, the signal-to-noise ratio increases when the modulation amplitude increases.

Figure 3:
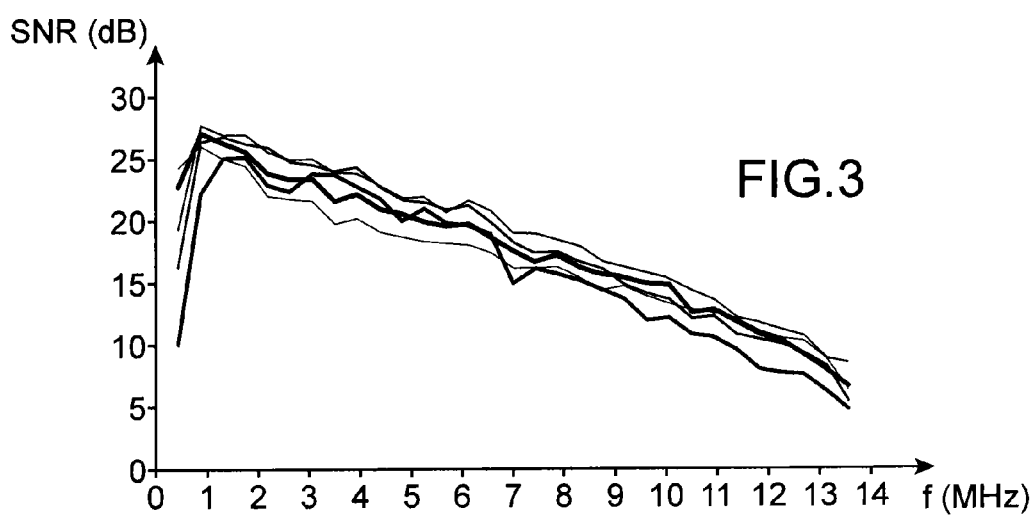
FIG. 3 corresponds to FIG. 1, and for a third value of said DC component.

FIG. 3 corresponds to FIG. 1, except that the DC component of the supply voltage is equal to 2.62 V.

The different curves always correspond to modulation amplitudes of 0.35 V; 0.25 V; 0.15 V; 0.10 V; 0.05 V. These curves are this time very close to each other (for a given frequency, a difference of less than 5 dB between the maximum SNR curve and the minimum SNR curve, versus at least 10 dB in the two preceding cases).

The same observations have been made for different LED models, and for different distances between the LED and the photodetector.

Thus, it may have been deduced therefrom that two operational regimens, or behaviours of a LED could be distinguished, irrespective of the model thereof:
 a first behaviour, such that the signal-to-noise ratio (and thus the rate) increases when the modulation amplitude increases (and conversely);
 a second behaviour, such that the signal-to-noise ratio (and thus the rate) increases when the modulation amplitude decreases (and conversely).

The first behaviour corresponds to high values of the DC component of the supply voltage of the LED. It corresponds in particular to a DC component higher than a threshold value of the DC voltage herein called a first reversal value.

The second behaviour corresponds to low values of the DC component of the supply voltage of the LED. It corresponds in particular to a DC component lower than said first reversal value.

A third behaviour can be defined, which corresponds to a DC component close to said first reversal value (for example within 5%). This third behaviour corresponds to a case wherein the signal-to-noise ratio does not depend on the modulation amplitude. It is said that the signal-to-noise ratio does not depend on the modulation amplitude, for example, when it varies within less than 5 dB throughout the modulation amplitude range desired to be used to code a piece of information, ranging for example from 2% to 30% of the DC component of the supply voltage of the LED.

Returning to the curves of FIGS. 1 to 3, it is deduced that in this experience, the first reversal voltage is close to 2.62 V (value for FIG. 3, on which the signal-to-noise ratio does not vary much with the modulation amplitude). To each LED corresponds an own first reversal value.

FIGS. 1 to 3 show variations of the signal-to-noise ratio corresponding to different values of the DC component of the supply voltage. But, the characteristic I(V) of a LED is a bijection. In other words, to a value of the supply voltage corresponds a single value of the supply current. The previous conclusions can therefore be generalized to any supply signal comprising a DC component and an AC component with a zero average; this supply signal can be a supply voltage or a supply current of the LED. The first reversal value can therefore be a first reversal voltage, or a first reversal current.

In what follows, and in a non-limiting way, the example of a first supply voltage and a first reversal voltage is developed. Similar examples could readily be developed by replacing the voltages by currents.

In the same way, FIGS. 1 to 3 show variations of the signal-to-noise ratio corresponding to different values of the DC component of the supply signal. But it can be shown that similar results are obtained with any other so-called useful parameter, representative of the transmission quality of the so-called useful signal, emitted by the emitting means of a Li-Fi system and received by the receiving means of this system.

The useful parameter can be measured on a signal representative of the spectral decomposition of the useful signal. The useful parameter is then for example an absolute maximum intensity, or a relative maximum intensity.

The useful parameter can also be measured on a signal corresponding to the useful signal after decoding. The useful parameter is then for example a Bit Error Rate (BER). Alternatively, the useful parameter is a frame error rate (rate of rejected frames because considered as non-valid), or a packet error rate (rate of packets rejected because considered as non-valid). Such useful parameters advantageously assume that the signal emitted by the emitting means of a Li-Fi system, in particular the information encoded in this signal, is known. Therefore, the information encoded upon emitting and the information received by the receiving means of the Li-Fi system can be compared. Alternatively, this signal is not known, and an error rate is determined using an error detection code, upon receiving (for example a CRC ("Cycle Redundancy Check") code).

The useful parameter can be obtained from the signal-to-noise ratio. This is for example a capacity of the transmission channel.

These other useful parameters can also be readily related to the rate: the better the transmission quality between the emitting means of a Li-Fi system and the receiving means of this system, the better the rate.

Throughout what follows, and in a non-limiting way, the example of the measurement of the signal-to-noise ratio is developed. Similar examples could readily be developed by replacing the signal-to-noise ratio by any other parameter representative of the transmission quality of a signal.

Considering a LED supplied with a voltage comprising a DC component and an AC component with a zero average, then it has been observed that the average luminous flux provided by this LED depends on the modulation amplitude of the AC component. This observation is counter intuitive to those skilled in the art. Indeed, since the AC component has a zero average, it should not influence the value of this luminous flux. The invention exploits these observations, showing that the optical properties of the LED depend in particular on the characteristics of its electric supply.

Figure 4:
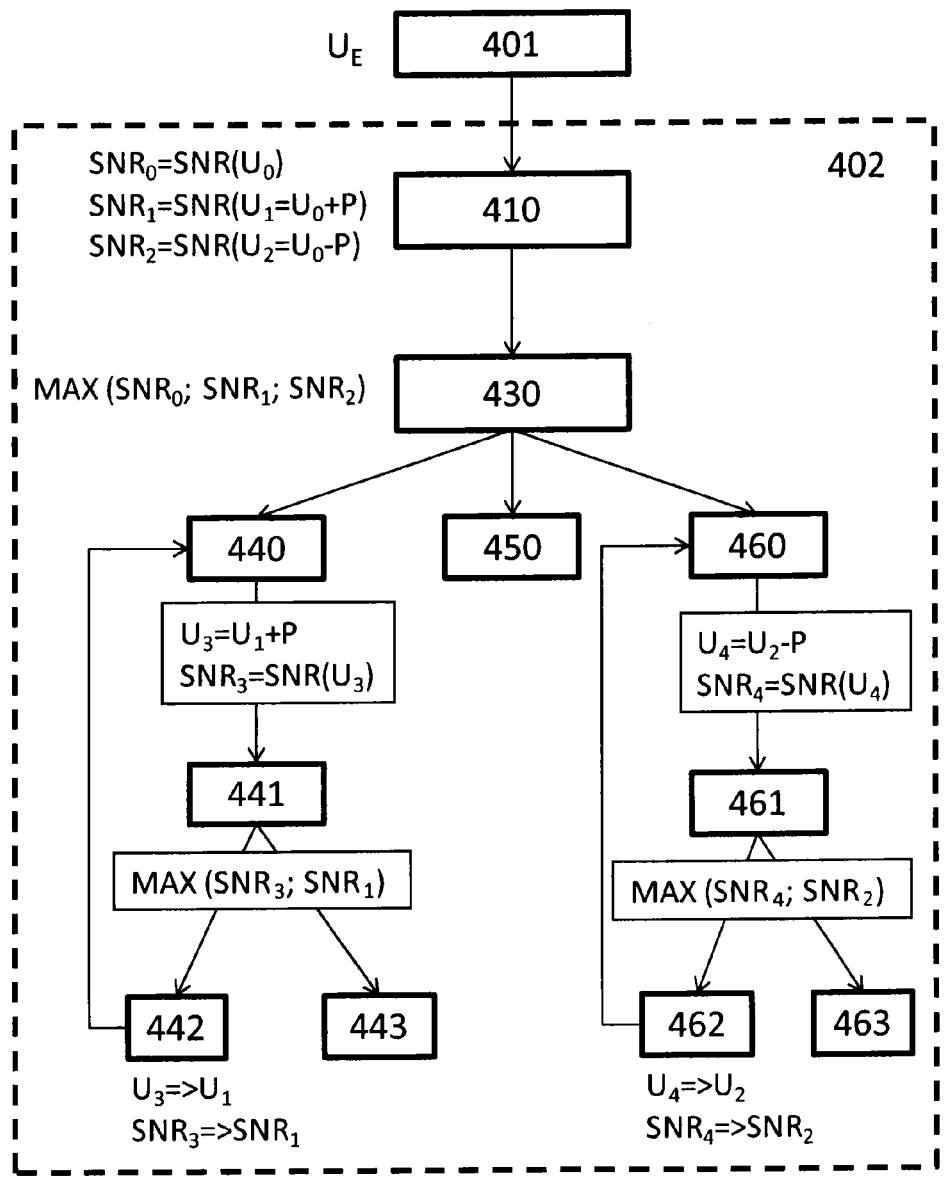
FIG. 4 schematically illustrates a first embodiment of a method according to the invention.

FIG. 4 schematically illustrates a first embodiment of a method according to the invention.

This method aims at optimizing a data rate passing between a LED and a photodetector forming respectively the emitting and receiving means of a Li-Fi wireless communication system.

In the example represented in FIG. 4, the photodetector is a simple photodiode, or any other means for detecting photons having a great detection spectral width (for example higher than 50 nm). Such a means for detecting photons provides a measurement corresponding to the sum of the received photons, for all the wavelengths of the detection spectral width called a spectral band of interest. The spectral band of interest typically corresponds to the emission spectral band of the LED.

The LED advantageously provides a predetermined signal. In particular, during the entire adjusting step as described in what follows, the LED advantageously provides a signal having the same frame. Thus, it is ensured that only a single parameter varies at a time, likely to modify the transmission quality of the signal.

According to a particular embodiment of the invention, during the entire adjusting step as described in what follows, the LED provides an identical signal.

The LED is supplied with a supply voltage comprising a DC component, and an AC component. The LED has two functions: a lighting function by a DC component of the light signal it emits, and an information transmission function via a modulated component of this light signal.

Throughout the text, an AC component of the supply voltage having a zero average is considered. In the simplest case, this corresponds to an information coding thanks to a modulation of the light intensity with a zero average. However, even when the information coding corresponds to a modulation of the light intensity having a non-zero average, it is still possible to decompose in fine the supply voltage into a DC component and an AC component with a zero average.

The method according to the invention comprises a first step 401 of setting a value $U_E$ for the DC component of the supply voltage of the LED. This value $U_E$ is set in particular as a function of lighting requirements. For example, a low $U_E$ is chosen for a soft lighting, and a high $U_E$ is chosen for a strong lighting.

During a second step 402, the modulation amplitude $U_M$ of the AC component of the supply voltage of the LED is adjusted, so as to improve the data rate provided by the LED and received by the photodetector.

In the example developed herein, the useful parameter as previously defined is the signal-to-noise ratio. An improvement in the data rate corresponds to an increase in the signal-to-noise ratio. Step 402 thus consists in obtaining a higher signal-to-noise ratio. As a function of the nature of the useful parameter, the adjustment corresponds to an increase or decrease of the useful parameter. For example, an improvement in the data rate corresponds to a decrease of the bit error rate or the packet error rate or the frame error rate.

Preferably, step 402 consists in optimizing the data rate, by searching for an extremum of the useful parameter. In the example developed herein, it is attempted to obtain the signal-to-noise ratio as high as possible.

The signal-to-noise ratio is measured on an electrical signal provided by the photodetector in response to the reception of the light signal emitted by the LED. Thus, the signal-to-noise ratio associated with the useful signal as previously defined is measured. The measurement of the signal-to-noise ratio can implement a measurement of the maximum, average or minimum amplitude of said electrical signal, the measurement of the noise of said electrical signal, and the calculation of the ratio between both these measurements.

Alternatively, the signal-to-noise ratio is measured by the following steps of:
emitting a predetermined light signal by the LED;
propagating this light signal between the LED and the photodetector;
receiving, by the photodetector, the useful signal corresponding to the signal emitted by the LED, and then propagated from the LED to the photodetector. The photodetector provides an electrical signal, in response to this reception;
measuring the signal-to-noise ratio of said electrical signal, by comparing the useful signal measured by the photodetector and the predetermined light signal.

The signal-to-noise ratio can be measured on a constellation diagram of said electrical signal.

Any other method for measuring a signal-to-noise ratio can be implemented without departing from the scope of the present invention. These measurement methods are well known to those skilled in the art, therefore they will not be further described.

The modulation amplitude $U_M$ is modified by successive increments.

Preferably, an initial value $U_0$ is chosen for the modulation amplitude $U_M$ as a function of the value of the DC component of the supply voltage. For example, this initial value $U_0$ is between 2% and 30% of $U_E$, in particular between 5% and 20%, for example 15%.

Preferably, the value of the increment P is chosen as a function of the initial value $U_0$ of the modulation amplitude. For example, this increment P is between 0.5% and 5% of $U_0$, in particular between 1% and 3%, for example 2%.

The particular example of adjusting the modulation amplitude $U_M$ will now be described, as illustrated in FIG. 4.

This adjustment 402 comprises an initial step 410 of measuring the signal-to-noise ratios obtained:
for the initial modulation amplitude $U_0$;
for the initial modulation amplitude which is increased by the value of the increment: $U_0+P$. The variable $U_1$, which takes as an initial value $U_0+P$, is defined;
for the initial modulation amplitude which is decreased by the value of the increment: $U_0-P$. The variable $U_2$ is defined which takes as an initial value $U_0-P$.

Thus, three signal-to-noise ratios respectively noted $SNR_0$, $SNR_1$ and $SNR_2$ are obtained. There is $SNR_0=SNR(U_0)$; $SNR_1=SNR(U_1)$; $SNR_2=SNR(U_2)$.

In a step 430, among these three signal-to-noise ratios, it is searched for the highest one. The highest signal-to-noise ratio from $SNR_0$, $SNR_1$ and $SNR_2$ is called a "local maximum".

Then, three cases are identified:
a first case wherein the local maximum is $SNR_0$;
a second case wherein the local maximum is $SNR_1$;
a third case wherein the local maximum is $SNR_2$.

In the first case, it is not necessary to modify the modulation amplitude. In step 450, the modulation amplitude optimized and equal to the initial modulation amplitude $U_0$ is provided.

In the second case, the signal-to-noise ratio increases when the modulation amplitude increases. Then, the LED has the first behaviour as defined above. The signal-to-noise ratio then tends to increase when the modulation amplitude increases, until it reaches a maximum value. Therefore, it is no longer necessary to test modulation amplitudes lower than the initial modulation amplitude $U_0$. The adjustment of the modulation amplitude is thus continued, by increasing it by successive increments P.

The adjustment can be continued until the signal-to-noise ratio does not increase any longer when the modulation amplitude increases (obtaining the maximum signal-to-noise ratio), as described below.

The variable $U_3$ is defined which takes as an initial value $U_1+P$ (modulation amplitude $U_1$ added to the value of the increment P). During step 440, the signal-to-noise ratio $SNR_3$ is measured, associated with $U_3$. During step 441, the maximum signal-to-noise ratio is searched for, from the signal-to-noise ratio $SNR_3$ and the signal-to-noise ratio $SNR_1$ previously measured. If the maximum signal-to-noise ratio is $SNR_1$, this means that the optimized modulation amplitude corresponds to the value taken by $U_1$. The adjustment of the modulation amplitude can then be stopped. In step 443, the optimized modulation amplitude equal to the value taken by $U_1$ is provided. If the maximum signal-to-noise ratio is $SNR_3$, this means that the modulation amplitude should maybe be further adjusted before reaching its optimized value (absolute maximum of the signal-to-noise ratio). In step 442, the value of $U_3$ is ascribed to the variable $U_1$ and thus the value of $SNR_3$ is ascribed to the variable $SNR_1$. Then, steps 440 and 441 are reiterated. Accordingly, this can be called a loop or iterative method. Thus, there will be, at the $n^{th}$ iteration of steps 440 and 441: $U_1=U_0+n*P$ and $U_3=U_0+(n+1)*P$. The iterations come to an end when the maximum signal-to-noise ratio identified in step 441 is $SNR_1$.

Alternatively, the iterations are stopped before the maximum signal-to-noise ratio is obtained. However, the signal-to-noise ratio will be increased with respect to the situation before adjusting the modulation amplitude.

In the third case, the signal-to-noise ratio increases when the modulation amplitude decreases. Therefore, the LED has the second behaviour as defined before. The signal-to-noise ratio then tends to increase when the modulation amplitude decreases, until it reaches a maximum value. Thus, it is no longer necessary to test modulation amplitudes higher than the initial modulation amplitude $U_0$. Accordingly, the adjustment of the modulation amplitude is continued, by decreasing it by successive increments P.

The adjustment can be continued until the signal-to-noise ratio does not increase any longer when the modulation amplitude decreases (obtaining the maximum signal-to-noise ratio), as described below.

The variable $U_4$ is defined which takes as an initial value $U_2-P$ (modulation amplitude $U_2$ which is decreased by the value of the increment P). During step 460, the signal-to-noise ratio $SNR_4$ is measured, associated with $U_4$. During step 461, the maximum signal-to-noise ratio is searched for, from the signal-to-noise ratio $SNR_4$ and the signal-to-noise ratio $SNR_2$ previously measured. If the maximum signal-to-noise ratio is $SNR_2$, this means that the optimized modulation amplitude corresponds to the value taken by $U_2$. The adjustment of the modulation amplitude can therefore be stopped. In step 463, the optimized modulation amplitude equal to the value taken by $U_2$ is provided. If the maximum signal-to-noise ratio is $SNR_4$, this means that the modulation amplitude should maybe be further adjusted before reaching its optimized value (absolute maximum of the signal-to-noise ratio). In step 462, the value of $U_4$ is ascribed to the variable $U_2$, and thus the value of $SNR_4$ is ascribed to the variable $SNR_2$. Then, steps 460 and 461 are reiterated. Accordingly, this can be called a loop or iterative method. Thus, there will be, at the $n^{th}$ iteration of steps 460 and 461: $U_2=U_0-n*P$ and $U_4=U_0-(n+1)*P$. The iterations come to an end when the maximum signal-to-noise ratio identified in step 461 is $SNR_2$.

Alternatively, the iterations are stopped before the maximum signal-to-noise ratio is obtained. The signal-to-noise ratio will be however increased with respect to the situation before adjusting the modulation amplitude.

The value of the increment can vary during the implementation of the adjusting method.

Thus, the invention provides a method of adjusting a modulation amplitude of the supply signal of the LED of a Li-Fi system, enabling the data transmission rate of the Li-Fi system to be optimized while meeting a given requirement for lighting. An optimization by the modulation amplitude makes up an original optimization means, especially as there is no evidence a priori that an accurate adjustment of this parameter could influence the rate. The adjustment is made after the value of the DC component of the supply signal has been set, which also contributes to the original character of this method.

The adjustment does not consist simply in checking that the modulation amplitude is within a wide operating range, but also in refining a positioning of the modulation amplitude within this range, even if it means approaching the bounds of said range whereas those skilled in the art will be generally prompted to work away from these bounds.

One advantage of the embodiment described in reference to FIG. 4 is that after a step 410 for identifying in which direction the modulation amplitude should be modified for the adjustment (gradual increase or decrease in its value), the adjustment is only made by successive increases, respectively successive decreases. Thus, a number of calculations and measurements necessary to achieve the optimized value of the modulation amplitude is decreased.

As a simple rule, it can be set to prefer large modulation amplitudes when it is desired to combine a transmission function with an intense lighting function, and to prefer low modulation amplitudes when it is desired to combine transmission function and low lighting function.

According to an alternative not represented, the useful parameter is measured on a signal representative of the spectral decomposition of the useful signal. In this case, the photodetector is able to classify the photons received as a function of their wavelength. Such a photodetector comprises for example a diode array cooperating with spectral dispersion means such as a slot. Such a photodetector provides a measurement indicating, for each wavelength of the spectral band of interest, the received light intensity.

According to another alternative not represented, the useful parameter is a bit error rate, or a frame error rate, or a packet error rate. Data encoded in the light signal emitted by the LED are advantageously known, to be compared to the data received. Generally, this is called a known emitting signal. Alternatively, this signal is not known, and the error rate is determined by using an error detection code.

The methods for measuring a bit error rate, a frame error rate, a packet error rate or any other parameter representative of the quality of the useful signal are well known to those skilled in the art. Therefore, they will not be further described in what follows.

Figure 5:
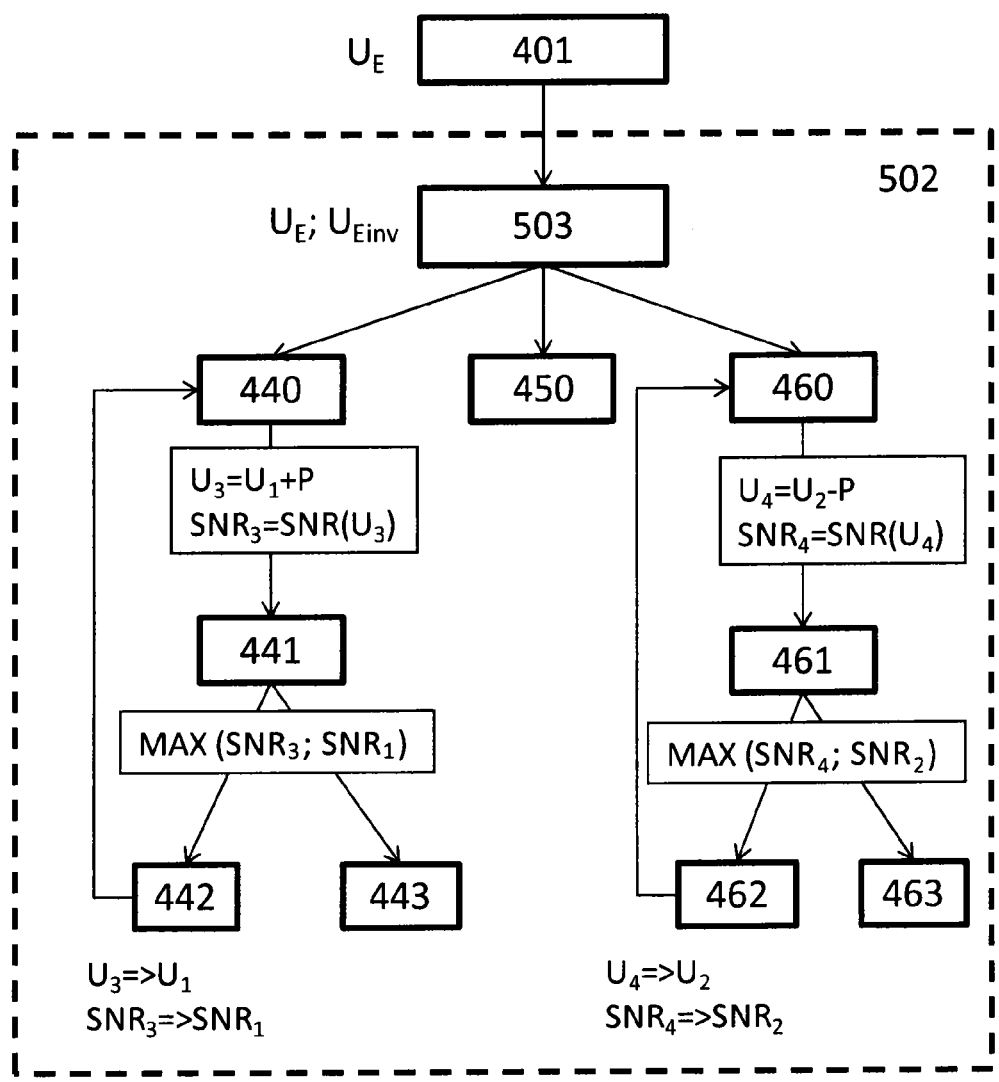
FIG. 5 schematically illustrates an alternative of the first embodiment of a method according to the invention.

FIG. 5 illustrates an alternative to the method illustrated in FIG. 4.

The method of FIG. 5 differs from the method of FIG. 4 in that the adjusting step 502 begins with a step 503 of comparing the value $U_E$ of the DC component of the supply voltage of the LED, with the first reversal voltage as defined in reference to FIGS. 1 to 3. The first reversal voltage is noted $U_{Einv}$.

If $U_E$ is higher than $U_{Einv}$, the LED has the first behaviour as defined before. Then, steps 440, 441, 442, and 443 are implemented, as described in reference in FIG. 4. The incrementation can be started from a low initial modulation amplitude, for example 0.5% to 5% of $U_E$. For example, let $U_E$ equal 3 V, the initial modulation amplitude is 25 mV.

If $U_E$ is lower than $U_{Einv}$, the LED has the second behaviour as defined before. Steps 460, 461, 462 and 463 as described in reference to FIG. 4 are then implemented. The incrementation can be started from a high initial modulation amplitude, for example 30% to 15% of $U_E$. For example, let $U_E$ equal 3 V, the initial modulation amplitude is 0.5 V.

If $U_E$ is equal to $U_{Einv}$, the LED has the third behaviour as defined herein before. The signal-to-noise ratio does not depend on the amplitude of the modulation signal. No adjustment is then necessary. Step 450 as described in reference to FIG. 4 is directly implemented. Setting $U_E$ close to $U_{Einv}$ with a difference of less than 5% can be avoided, such that the LED has a behaviour such that an adjustment of the modulation amplitude is possible.

This method has the advantage of requiring a further reduced number of calculations and measurements in comparison with the method described in reference to FIG. 4. Indeed, instead of measuring and comparing three signal-to-noise ratios, a single comparison with $U_{Einv}$ is enough to determine how the adjustment should be continued.

This method assumes that the first reversal value $U_{Einv}$ is known.

Therefore, the method can comprise a step, not represented, of determining the first reversal value $U_{Einv}$.

$U_{Einv}$ can be determined experimentally, by varying the value of $U_E$ up to reach a value of $U_E$ such that the signal-to-noise ratio does not depend on the modulation amplitude. Alternatively, $U_{Einv}$ is determined by other methods which will be described in what follows.

FIGS. 6A to 6D illustrate impedance measurements of a LED, for different values of the DC component of its supply voltage, and for a frequency ranging from 75 kHz to 10 MHz. The same LED as for the measurements illustrated in FIGS. 1 to 3 has been used. The impedance measurements aim at characterizing the impedance Z of the LED. The axis of abscissas corresponds to the real part of the impedance Z. The axis of ordinates corresponds to the opposite of the imaginary part of the impedance Z. Each curve 61 can be called an impedance spectrum, or impedance measurement.

Figure 6A:
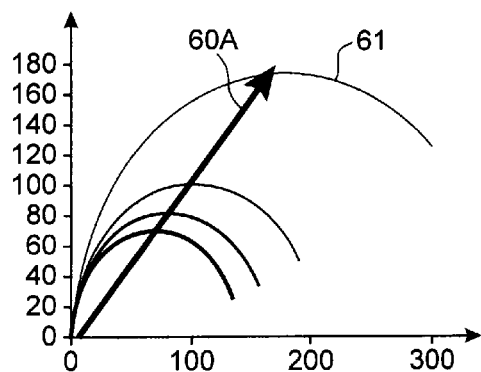
FIGS. 6A to 6D illustrate impedance measurements of said LED, for different values of the DC component of its supply voltage.

In FIG. 6A, the DC component of the supply voltage of the LED is equal to 2.30 V. As set out in reference to FIGS. 1 to 3, the LED then has the second behaviour, such that the signal-to-noise ratio increases when the modulation amplitude decreases. Each of the curves has a half-circle shape. By considering the curves with an increasing radius of the half-circle, they respectively correspond to a modulation amplitude of 1.41 V; 0.99 V; 0.71 V; 0.42 V (that is RMS values equal to 1 V; 0.7 V; 0.5 V; 0.3 V respectively. There is a factor $\sqrt{2}$ between the RMS value of a sinusoidal signal and its modulation amplitude). The arrow 60A illustrates the increase in the signal-to-noise ratio.

Figure 6B:
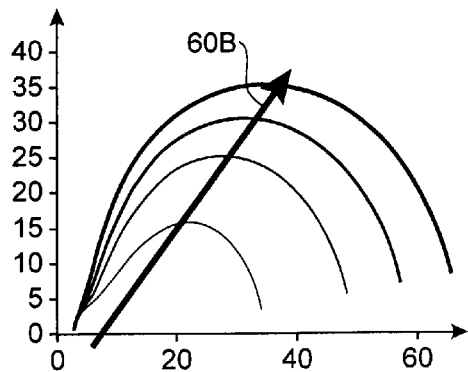

In FIG. 6B, the DC component of the supply voltage of the LED is equal to 3.00 V. As set out in reference to FIGS. 1 to 3, the LED then has the first behaviour, such that the signal-to-noise ratio increases when the modulation amplitude increases. By considering the curves with an increasing radius of the half-circle, they respectively correspond to a modulation amplitude of 0.42 V; 0.71 V; 0.99 V; 1.41 V (that is RMS values respectively equal to 0.3 V; 0.5 V; 0.7 V; 1 V). Arrow 60B illustrates the increase in the signal-to-noise ratio.

Figure 6C:
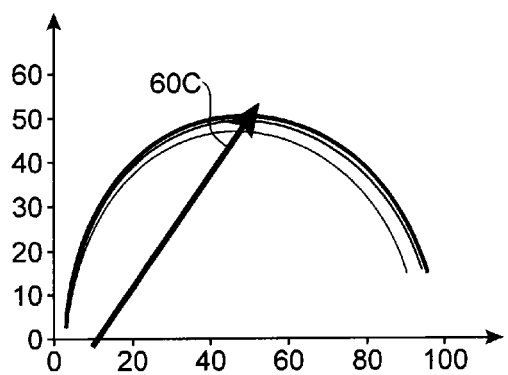

In FIG. 6C, the DC component of the supply voltage of the LED is equal to 2.60 V. By considering the curves with an increasing radius of the half-circle, they respectively correspond to a modulation amplitude of 0.42 V; 0.71 V; 0.99 V; 1.41 V (that is RMS values respectively equal to 0.3 V; 0.5 V; 0.7 V; 1 V). However, it can be seen that the curves are half-circles which have all substantially the same radius. The difference in radius between the half-circle with a maximum radius and that with a minimum radius is about 5Ω, whereas this difference is in the order of 100Ω in FIG. 6A, and 15Ω in FIG. 6B. Arrow 60C illustrates the increase in the signal-to-noise ratio.

Figure 6D:
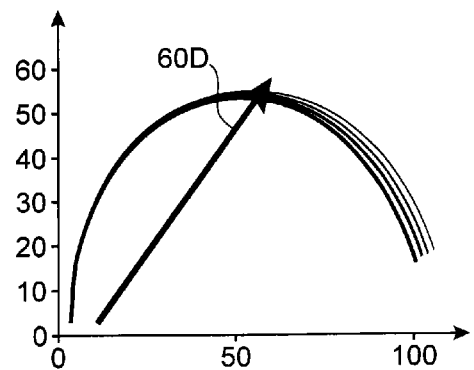

In FIG. 6D, the DC component of the supply voltage of the LED is equal to 2.55 V. By considering the curves with an increasing radius of the half-circle, they respectively correspond to a modulation amplitude of 1.41 V; 0.99 V; 0.71 V; 0.42 V (that is RMS values respectively equal to 1 V; 0.7 V; 0.5 V; 0.3 V). However, it can be seen that the curves are half-circles which all have substantially the same radius. The difference in radius between the half-circle with a maximum radius and that with a minimum radius is about 5Ω. Arrow 60D illustrates the increase in the signal-to-noise ratio.

The first reversal voltage is that which imposes that the radius of the half-circle corresponding to the impedance spectrum (or impedance measurement) of the LED is independent of the modulation amplitude. It is deduced from FIGS. 6A to 6D that the first reversal value is between 2.55 V and 2.60 V. For example, the average of these two voltages is retained, that is 2.57 V.

It is also observed, from FIGS. 6A to 6D, that the best signal-to-noise ratio is obtained herein for large radiuses of the impedance spectrum (or impedance measurement) of the LED, that is for large values of the equivalent resistance of the LED. But those skilled in the art are usually prompted, when biasing a LED, to search for a dynamic resistance as low as possible, so as to increase the luminous flux emitted, in the conventional operating range of the LED.

In the same way, it could be shown that an evolution of the useful parameter reflecting an improvement in the transmission quality of the useful signal corresponds here to large values of the equivalent resistance of the LED.

In the same way, a first reversal current can be measured, from impedance measurements made for different values of the DC component of the supply current.

Figure 7:
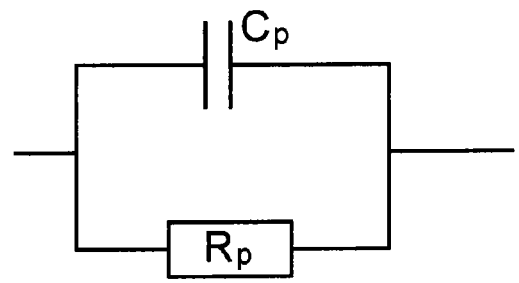
FIG. 7 illustrates a circuit equivalent to said LED.

Since the impedance spectra of the LED have a single half-circle shape, the LED can be modelled by the equivalent circuit consisting of a resistance $R_p$ in parallel with a capacitance $C_p$. This equivalent circuit is illustrated in FIG. 7. From this equivalent model, the values of $R_p$ and $C_p$ can be expressed as a function of the imaginary part of Z, Im(Z) and the real part of Z, Re(Z):

$$R_p = \text{Re}(Z) + \frac{[\text{Im}(Z)]^2}{\text{Re}(Z)}$$

$$C_p = -\frac{1}{2\pi f} \frac{\text{Im}(Z)}{[\text{Re}(Z)]^2 + [\text{Im}(Z)]^2}$$

Figure 8:
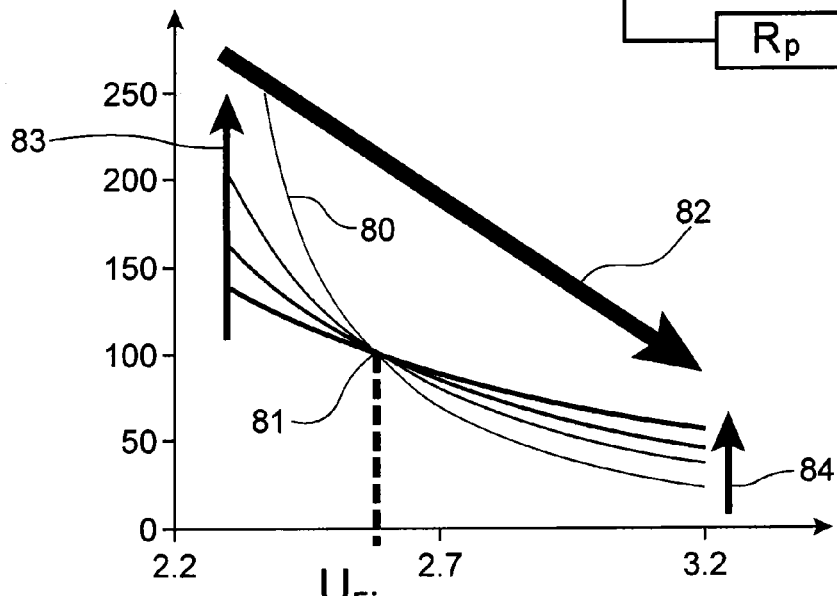
FIG. 8 illustrates equivalent resistance curves of said LED, as a function of the DC component of its supply voltage.

FIG. 8 illustrates curves 80 representing the equivalent resistance $R_p$, as a function of the DC component of the supply voltage of the LED. Arrow 82 reflects the increase in the average intensity of the luminous flux emitted by the LED. FIG. 8 is made for a fixed modulation frequency, herein 0.1 MHz.

Each curve corresponds to a modulation amplitude of the supply voltage. By considering the curves from bottom to top, and from the side of the axis of ordinates, they respectively correspond to a modulation amplitude of 1.41 V; 0.99 V; 0.71 V; 0.42 V (that is RMS values respectively equal to 1 V; 0.7 V; 0.5 V; 0.3 V).

The different curves intersect at a point 81 such that the equivalent resistance of the LED does not depend on the modulation amplitude. The abscissa of this point corresponds to the first reversal value $U_{Einv}$. Thus, $U_{Einv} \approx 2.55$ V is measured, which is consistent with the method set out in reference to FIGS. 6A to 6D.

At the left of this point, the signal-to-noise ratio increases when the modulation amplitude decreases (arrow 83). At the right of this point, the signal-to-noise ratio increases with the modulation amplitude (arrow 84).

It is noticed that in both cases illustrated here, the increase in the signal-to-noise ratio corresponds to an increase in the equivalent resistance of the LED. Such an observation is counter-intuitive to those skilled in the art, who generally expect that an increase in the signal-to-noise ratio corresponds to a decrease in the equivalent resistance of a LED.

In the same way, it could be shown that under the same conditions, the evolution of any other useful parameter for the purpose of improving the transmission quality of the useful signal corresponds to an increase in the equivalent resistance of the LED.

In the same way, the first reversal current could be measured, from an equivalent model of the LED set from impedance spectra (or impedance measurements) varying the DC component of the supply current of the LED.

Figure 9:
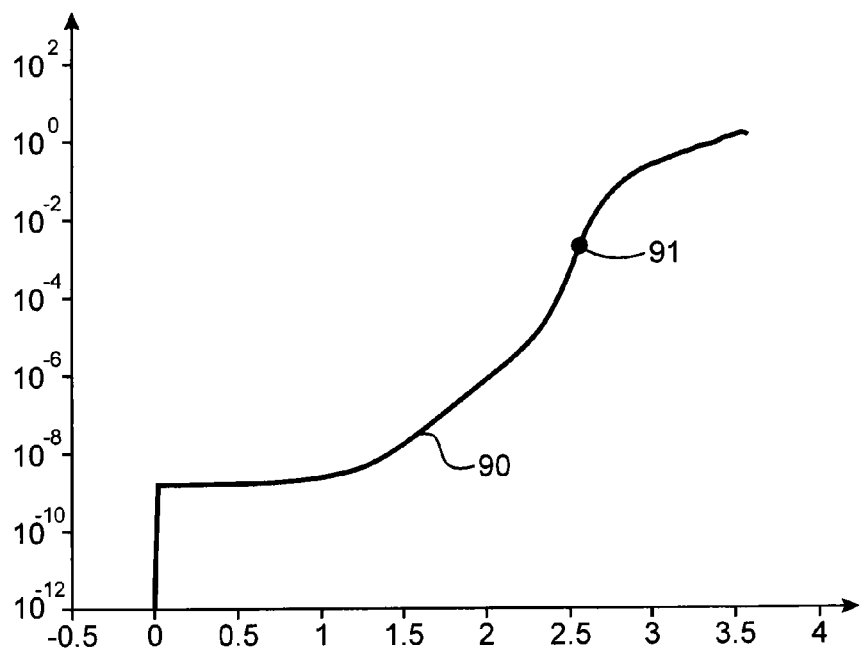
FIG. 9 illustrates the logarithm of the intensity of the current passing through the LED, as a function of its DC supply voltage.

FIG. 9 illustrates the common logarithm of the current intensity passing through the LED, log(I), as a function of $U_E$, where $U_E$ is its supply voltage, in Volt ($U_E$ is here a DC voltage, without AC component). This is a characteristic curve of a LED, generally provided by the manufacturer. This curve 90 has a point of inflexion 91, the abscissa of which substantially corresponds (within a few percent) to the first reversal voltage $U_{Einv}$.

This point of inflexion can be positioned by calculating the second derivative of $U_E$ relative to log(I):

$$\frac{d^2 U_E}{d(\log(I))^2}.$$

The value of $U_E$ for which this second derivative becomes zero corresponds to $U_{Einv}$. By this method, $U_{Einv} = 2.54$ V is obtained, which is consistent with the other methods proposed. Alternatively, the first derivative of $U_E$ relative to log(I):

$$\frac{dU_E}{d(\log(I))}$$

is calculated. On a curve representing this first derivative as a function of $U_E$, the point such that the derivative decreases before this point and increases after this point is searched for.

Such methods for determining $U_{Einv}$ have the drawback that artefacts of the curve 90 can make it difficult to determine $U_{Einv}$. It can be useful to identify a voltage range wherein the first reversal voltage is expected to be found. However, these methods have the advantage of directly exploiting a characteristic curve provided by the manufacturer of the LED, and therefore require no particular further measurement.

If the first reversal current is searched for, it is sufficient to focus on the ordinate of point 91 and no longer on its abscissa.

Several exemplary optimization modules and communication systems suitable for implementing a method according to the invention will now be described in reference to FIGS. 10 to 12.

As for the illustration of the method according to the invention, and for the sake of synthesis, it is chosen to develop only the example of a voltage adjustment from a measurement of the signal-to-noise ratio.

Numerous alternatives can be implemented without departing from the scope of the present invention, by performing a current adjustment and/or using another so-called useful parameter, as previously defined.

According to the useful parameter chosen, the adjustment according to the invention consists in increasing or decreasing the value of this parameter. As set out before, according to the parameter chosen, the useful parameter is measured on either signal corresponding to the useful signal.

Figure 10:
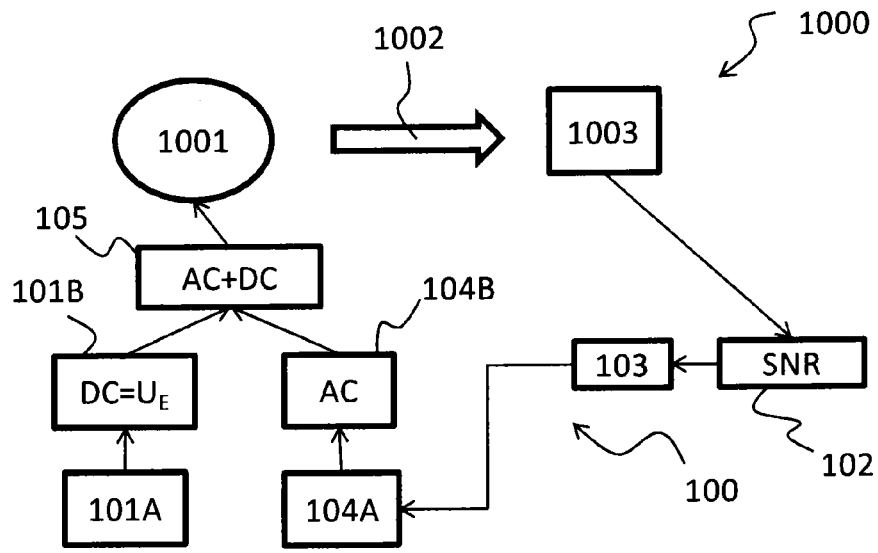
FIG. 10 schematically illustrates a first embodiment of an optimization module and a communication system according to the invention.

FIG. 10 schematically illustrates a first embodiment of an optimization module 100 and a communication system 1000 according to the invention.

The communication system 1000 comprises emitting means 1001 formed by a LED, preferably a LED emitting white light. Throughout the adjustment step as described in what follows, the LED advantageously provides a predetermined signal, as set out in reference to FIG. 4.

The luminous flux 1002 emitted by the LED 1001 is received by a photodetector 1003. The photodetector 1003 is suitable for transforming the luminous signal received into an electrical signal. This is here, for example, an avalanche photodiode. Any other type of photodetector can be used. Details about the photodetector are given in reference to FIG. 4, in particular in the case where the useful parameter is measured on a signal representative of the spectral decomposition of the useful signal.

In a full communication system, the photodetector 1003 is connected to calculating means suitable for exploiting the signal provided by the photodetector to extract therefrom information encoded upon emitting. The photodetector 1003 can comprise a filtering function to preserve only the AC component of a signal received.

The optimization module 100 as represented in FIG. 10 is suitable for implementing the method as described in reference to FIG. 4.

The optimization module 100 comprises:
- an intensity controller 101A, that is man-machine interface means, interfacing with a dedicated DC module 101B, to control the value of the DC component of the supply voltage of the LED. Thus, a DC voltage is set to the value $U_E$;
- signal processing means 102, connected to the photodetector 1003. The signal processing means 102 receive the electrical signal provided by the photodetector in response to the reception of a light signal emitted by the LED and received by the photodetector. The signal processing means are arranged to measure the signal-to-noise ratio of the useful signal, noted SNR;
- adjusting means 103, connected to the signal processing means 102 and receiving, as an input, the signal-to-noise ratio; and
- control means 104A, receiving, as an input, a driving signal from the adjusting means 103, and suitable for modifying the modulation amplitude of the AC component of the supply voltage. The control means drive in particular an AC module 104B. The AC module 104B provides an analog signal wherein data to be transmitted are encoded. The control means 104A enable the modulation amplitude of this analog signal to be modified. A module 105 is connected at the input to the modules 101B and 104B, and at the output to the LED 1001. The module 105 sums the signals provided by each of both modules 101B and 104B, to provide the AC+DC supply voltage of the LED 1001.

The DC module can be a voltage generator, a current generator, or a simple function generator.

The AC module receives as an input data to be transmitted (for example as a digital signal) and provides, as an output, an analogic AC signal. The AC module advantageously comprises a function generator. This function generator can be coupled to a voltage or current generator, to provide in fine an AC voltage or an AC current. The AC module 104B can form data encoding means, suitable for encoding digital data from a data source (for example Internet) as an analog signal.

The module 105 can sum voltages, sum currents, sum functions, sum a function and a voltage, sum a function and a current. The module 105 provides in fine the supply voltage of the LED, having a DC component and an AC component. The module 105 comprises in particular a so-called "bias tee" element (term referring to an electrical circuit for summing an AC signal and a DC signal).

The control means 104A are connected to the adjusting means 103 by a backward channel. The backward channel consists in particular in communication means, in particular communication means by infrared, by Bluetooth, by Li-Fi, etc. Thus, there is a bidirectional link between a block comprising the LED, the AC module, the DC module, the module 105, the intensity controller 101A and the control means 104A, and a block comprising the photodiode, the signal processing means 102 and the adjusting means 103.

Exemplary methods for measuring a signal-to-noise ratio have been detailed in reference to FIG. 4.

The signal processing means 102 can comprise a link with the AC module 104B, to define or detect the characteristics of the light signal emitted by the LED.

The adjusting means 103 are calculating means suitable for driving the control means 104A to modify the value of the modulation amplitude, so as to increase the signal-to-noise ratio. In particular, the adjusting means 103 are suitable for driving the control means 104A so as to obtain in fine a maximum signal-to-noise ratio.

Once the adjusting means 100 has enabled to reach the improved signal-to-noise ratio, for the chosen value of $U_E$, the corresponding value of the modulation amplitude of the AC component of the supply voltage is set, and the Li-Fi system thus parameterized is exploited. In particular, the signal provided by the photodetector 1003 is exploited to extract therefrom the information encoded upon emitting.

The optimization module 100 can comprise means receiving, as an input, the set value of $U_E$, which are arranged to calculate a value of the increment P and of the initial modulation amplitude $U_0$. Possible relationships between these values have been explained in reference to FIG. 4. These relationships are unchanged if a supply current is considered. It is sufficient to replace each voltage with a corresponding current.

The Li-Fi communication system can comprise a module of several LEDs emitting at different wavelengths, the sum of the optical spectra producing a white light. In this case, the modulation amplitude of each LED of the LED module is individually optimized.

According to an alternative not represented, the useful parameter is a bit error rate, a packet error rate, or a frame error rate. In this case, the optimization module according to the invention comprises the calculating means suitable for exploiting the signal provided by the photodetector to extract therefrom the information encoded upon emitting. The signal processing means 102 are connected to these calculating means to receive an electrical signal corresponding to the electrical signal received by the photodiode, and then decoded. The adjusting means 103 are connected to the signal processing means 102 and receive, as an input, the bit error rate or the packet error rate or the frame error rate. The signal processing means can comprise a link with the AC module, to define or detect the information encoded in the light signal emitted by the LED.

Figure 11:
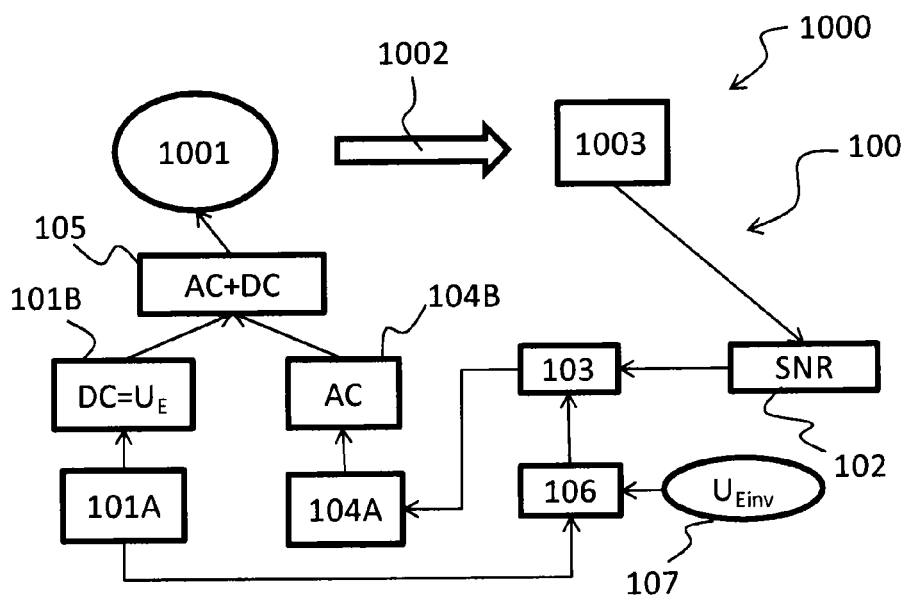
FIG. 11 schematically illustrates a first alternative of the optimization module and the communication system of FIG. 10.

FIG. 11 schematically illustrates a first alternative of the optimization module 100 and the communication system 1000 as described in reference to FIG. 10.

In the example represented in FIG. 11, the optimization module 100 is suitable for implementing the method as described in reference to FIG. 5.

The optimization module 100 illustrated in FIG. 11 differs from the optimization module illustrated in FIG. 10 in that it comprises comparison means 106, receiving, as an input, the value of $U_E$ set thanks to the intensity controller 101A, and the value $U_{Einv}$ of the first reversal voltage, stored in a memory 107. The comparison means 106 are suitable for comparing $U_E$ and $U_{Einv}$, and driving the adjusting means 103 for the latter to adapt the adjustment to the result of the comparison, according to the adjusting method as described in reference to FIG. 5.

The value of $U_{Einv}$ can be determined by one of the methods described in reference to FIGS. 6A to 9, and then stored in the memory 107.

Figure 12:
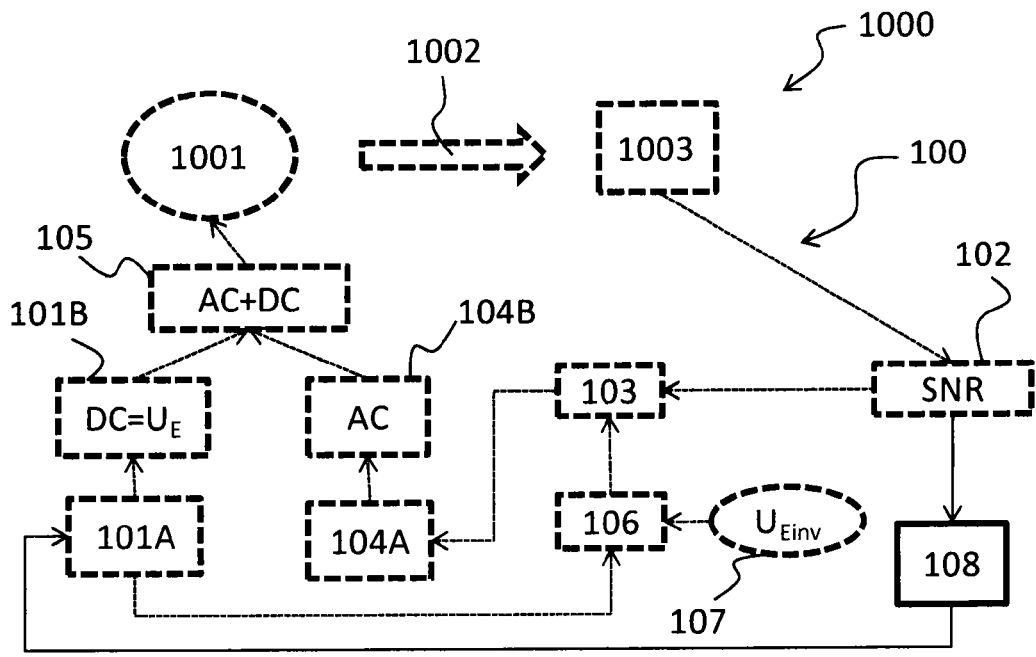
FIG. 12 schematically illustrates a second alternative of the optimization module and the communication system of FIG. 10.

FIG. 12 schematically illustrates a second alternative of the optimization module 100 and the communication system 1000 illustrated in FIG. 10. The optimization module 100 of FIG. 12 only differs from the optimization module of FIG.

11 in that it comprises means 108 for determining the value of $U_{Einv}$. For reasons of legibility of the figure, the elements of FIG. 11 that are found in FIG. 12 are represented in dotted lines, in order to easily identify differences between both figures.

The means 108 for determining the value of $U_{Einv}$ receive, as an input, the signal-to-noise ratio calculated by the signal processing means 102, and drive the intensity controller 101A to modify the DC component $U_E$ of the supply signal. The value of $U_{Einv}$ is obtained by varying the value of $U_E$ until a value of $U_E$ is reached such that the signal-to-noise ratio does not depend on the value of the modulation amplitude. For the sake of clarity of the figure, FIG. 12 does not show the driving of the control means 104A by the means 108 for varying the modulation amplitude, for each value of $U_E$. For the same reason, the link between the means 108 and the memory 107 is not represented, corresponding to the storage of the value of $U_{Einv}$ in the memory 107, once it is determined by the means 108.

A second embodiment of a method and system according to the invention will now be described, also aiming at optimizing a data transmission rate in a Li-Fi system by exploiting the properties illustrated in FIGS. 1 to 3.

Indeed, a relation was established between the DC component of the supply signal of the LED, the modulation amplitude of the AC component of this supply signal, and the useful parameter as defined before.

An optimization method and module have thus been provided, wherein the value of the DC component of the supply voltage is set as a function of a lighting requirement, and then the modulation amplitude of the AC component of the supply signal is adjusted to optimize the rate. Alternatively, and symmetrically, the invention also provides an optimization method and module, wherein the modulation amplitude of the AC component of the supply signal of the LED is set and then the value of the DC component of this supply signal is adjusted, so as to optimize the rate.

The modulation amplitude of the AC component of the supply signal of the LED is set, for example as a function of a communication requirement (in particular a requirement for a signal coverage range, or a minimum rate to be ensured).

In the same way that there is a first reversal value (for example noted $U_{Einv}$), distinguishing two behaviours of the LED and corresponding to a particular value of the DC component of the supply signal, there is a second reversal value (for example noted $U_{Minv}$), separating two behaviours of the LED and corresponding to a particular value of the AC component of the supply signal. This second reversal value separates:

- a first behaviour, such as the transmission quality of the signal emitted by the LED and received by the photodetector, increases when the DC component of the supply signal increases (and conversely); and
- a second behaviour, such as the transmission quality of the signal emitted by the LED and received by the photodetector, increases when the DC component of the supply signal decreases (and conversely).

The second reversal value can be obtained by methods similar to those described regarding the first reversal value.

This alternative is advantageous for applications wherein a particular lighting intensity is not searched for. For example, the emitting means of the Li-Fi system can be LEDs of a LED screen or of a screen of smart phone having LEDs. The main function of a screen is not lighting. The DC component of the supply signal of the LED may then be adjusted, without impacting the primary function thereof, which is not lighting but simply image display that can involve a large range of light intensities.

As previously, and for the sake of synthesis, it is chosen to develop only the example of an adjustment in voltage from a measurement of the signal-to-noise ratio. Numerous alternatives can be implemented without departing from the scope of the present invention, by making an adjustment in current and/or using another parameter characteristic of the transmission quality of the useful signal.

Figure 13:
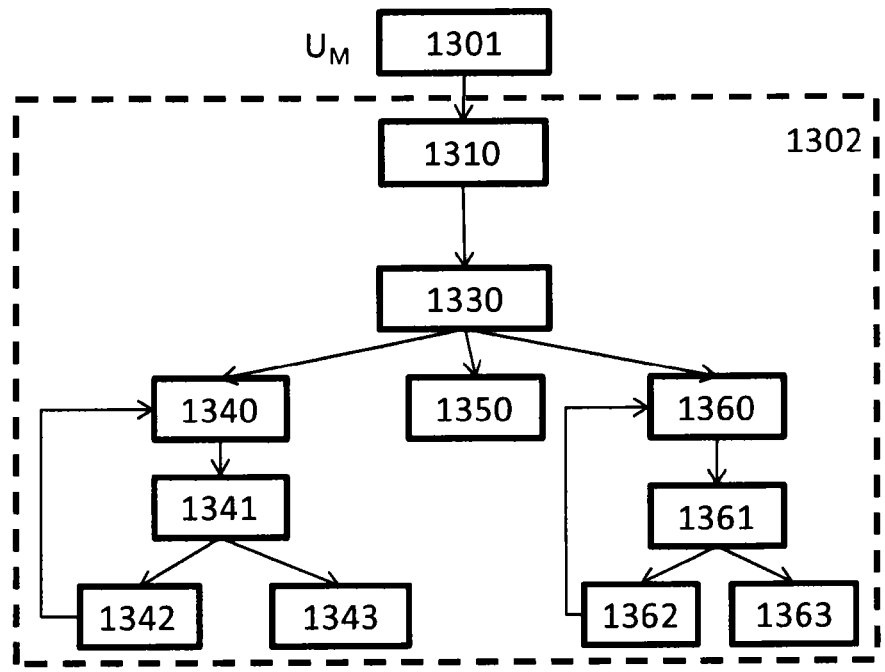
FIG. 13 schematically illustrates a second embodiment of a method according to the invention.

FIG. 13 schematically illustrates the second embodiment of a method according to the invention.

The initial step 1301 consists in setting the value $U_M$ of the modulation amplitude of the AC component of the supply voltage of the LED.

The adjustment 1302 is then similar to the adjustment 402 of the FIG. 4, except that the DC component of the supply voltage, and not the modulation amplitude, is adjusted by successive increments.

Steps 1310, 1330, 1340, 1350, 1360, 1341, 1361, 1342, 1343, 1362, 1363 respectively correspond to steps 410, 430, 440, 450, 460, 441, 461, 442, 443, 462, 463 of the method of FIG. 4, by replacing:

- the initial modulation amplitude $U_0$ described in reference to FIG. 4, with an initial DC component $U_{E0}$; and
- the modulation increment P described in reference to FIG. 4 with a DC voltage increment P'.

Preferably, an initial value $U_{E0}$ is chosen for the DC component, as a function of the modulation amplitude $U_M$ of the AC component of the supply voltage. For example, this initial value $U_{E0}$ is between 3 and 50 times the value of $U_M$, in particular between 3 and 20 times the value of $U_M$, for example 7 times the value of $U_M$.

Preferably, the value of the increment P' is chosen as a function of the initial value $U_{E0}$ of the DC component. For example, this increment P' is between 0.5% and 5% of $U_{E0}$, in particular between 1% and 3%, for example 2%.

Figure 14:
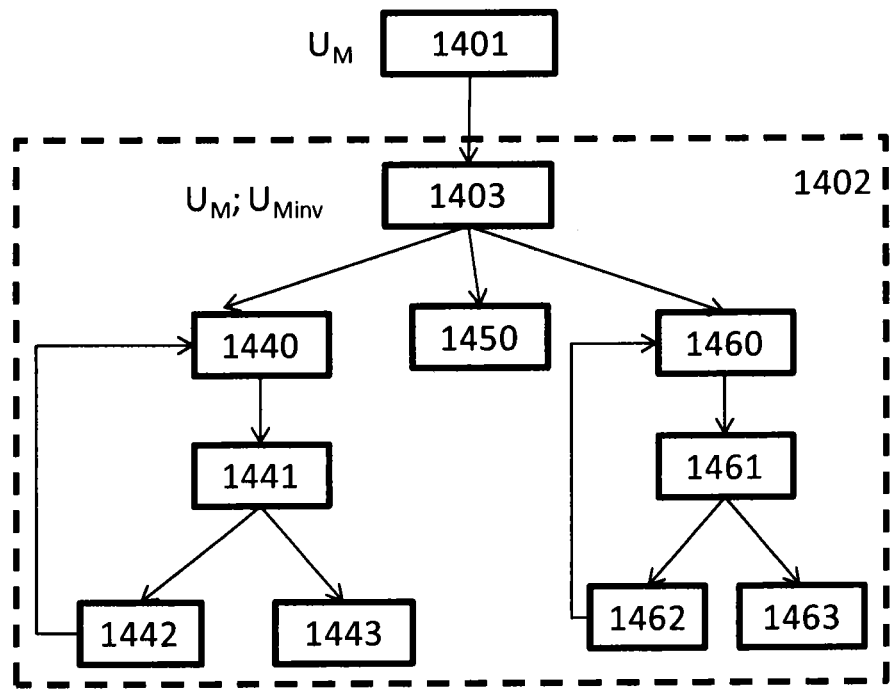
FIG. 14 schematically illustrates an alternative of the method of FIG. 13.

FIG. 14 illustrates an alternative of the method illustrated in reference to FIG. 13. This method differs from the method of FIG. 13 in that the adjustment 1402 is this time similar to the adjustment 502 of FIG. 5, except that the DC component of the supply voltage, and not the modulation amplitude, is adjusted by successive increments.

Steps 1403, 1440, 1450, 1460, 1441, 1461, 1442, 1443, 1462, 1463 respectively correspond to steps 503, 440, 450, 460, 441, 461, 442, 443, 462, 463 of the method of FIG. 5, by replacing:

- the initial modulation amplitude $U_0$ with an initial DC component $U_{E0}$;
- the modulation increment P, with a DC voltage increment P'; and
- the first reversal voltage $U_{Einv}$ with the second reversal value $U_{Minv}$.

Figure 15:
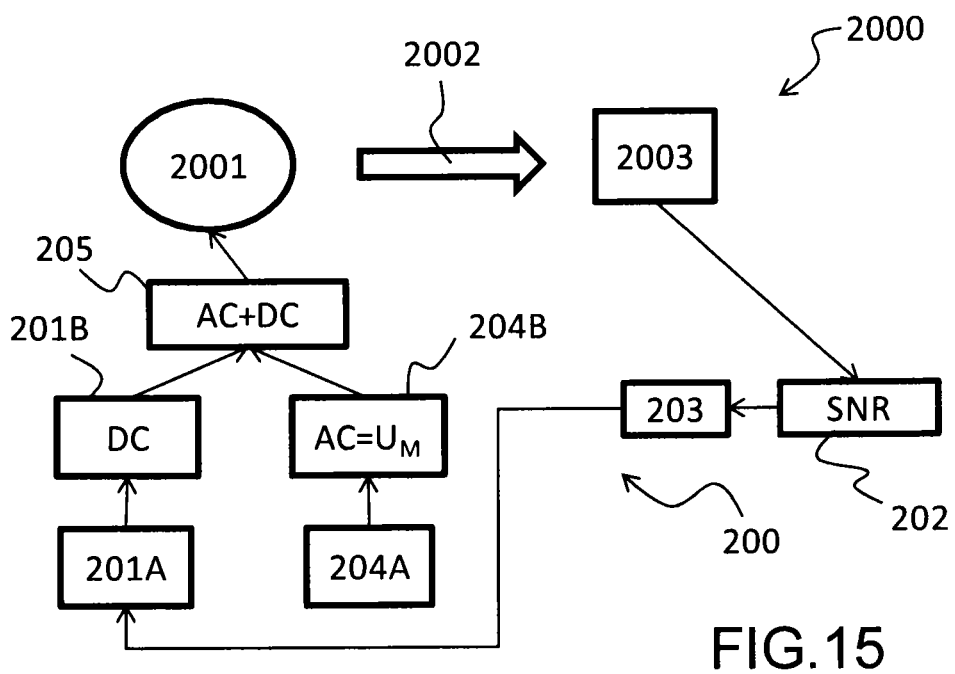
FIG. 15 schematically illustrates a second embodiment of an optimization module and a communication system according to the invention.

FIG. 15 schematically illustrates a second embodiment of an optimization module and a communication system according to the invention.

Reference numerals 2000, 200, 2001, 2002, 2003, 202, 205, 204B, 201B correspond to the reference numerals 1000, 100, 1001, 1002, 1003, 102, 105, 104B, 101B of FIG. 10.

The optimization module 200 of FIG. 15 differs from the optimization module 100 of FIG. 10, in that it is suitable for implementing the method as described in reference to FIG. 13.

The optimization module 200 comprises:

- a modulation amplitude controller 204A, that is man-machine interface means, interfacing with the AC module 204B. The modulation amplitude controller 204A sets the value of the modulation amplitude of the AC component of the supply voltage of the LED. Thus, a modulation amplitude of an AC voltage is set to the value $U_M$;

signal processing means 202;

adjusting means 203, connected to the signal processing means 202 and receiving, as an input, the signal-to-noise ratio measured by the signal processing means 202; and control means 201A, receiving, as an input, a driving signal from the adjusting means 203, and suitable for driving the DC module 201B to modify the DC component of the supply voltage.

The adjusting means 203 are calculating means suitable for driving the control means 201A, to modify the value of the DC component, so as to obtain a better signal-to-noise ratio, in particular a maximum signal-to-noise ratio.

Once the adjusting module 200 has allowed to reach the improved signal-to-noise ratio, for the chosen value of $U_M$, the corresponding value of the DC component of the supply voltage is set, and the signal provided by the photodetector 2003 is exploited to extract therefrom the information encoded upon emitting.

Different alternatives of the module 200 can be implemented, on the model of the modules 100 illustrated in FIGS. 11 and 12, in particular modules suitable for implementing the method of FIG. 14.

The module 200 can comprise means for comparing $U_M$ with $U_{Minv}$. Such an alternative comprises, if necessary, means for determining the value of $U_{Minv}$. These means receive, as an input, the signal-to-noise ratio of the useful signal, and drive the modulation amplitude controller 204A to modify the modulation amplitude by successive increments, until a value of $U_M$ is reached such that the signal-to-noise ratio does not depend on the value of the DC component of the supply voltage of the LED.

The invention has numerous applications. It can be suitable for any pre-existing lighting system, wherein a LED is connected to an intensity controller. Such a system is for example present in various screens such as computer, TV, tablet computer, smart phone, etc. screens.

The invention claimed is:

1. A method for optimizing the data rate, in a wireless communication system comprising a light-emitting diode forming emitting means, said light-emitting diode being supplied with a supply signal comprising a DC component and an AC component, wherein said method comprises the following steps:
    setting a value of the DC component of the supply signal;
    adjusting a modulation amplitude of the AC component of the supply signal, from a measurement of a parameter, said parameter being representative of the transmission quality of a signal, said signal corresponding to a light signal emitted by the light-emitting diode and received by a photodetector forming receiving means of the wireless communication system.

2. The method according to claim 1, wherein said adjusting is made by successive increments.

3. The method according to claim 1, wherein the parameter representative of the transmission quality of the signal is a signal-to-noise ratio or a bit error rate, or a packet error rate or a frame error rate.

4. The method according to claim 1, wherein said adjusting of a modulation amplitude comprises the following steps:
    an initial step of measuring the values of the parameter obtained for an initial modulation amplitude, for said initial modulation amplitude plus a modulation amplitude increment, and for said initial modulation amplitude minus said increment;
    searching for a local extremum, said local extremum being the value of the parameter corresponding to the best transmission quality of the signal, among said values of the parameter which are measured;
    when said local extremum does not correspond to the initial modulation amplitude, continuing adjusting, by increasing the modulation amplitude if the local extremum corresponds to the initial modulation amplitude plus said increment, or by decreasing the modulation amplitude if the local extremum corresponds to the initial modulation amplitude minus said increment.

5. The method according to claim 1, further comprising a step of comparing the DC component of the supply signal with a first reversal value separating two behaviours of the light-emitting diode:
    a first behaviour such that the evolution of the value of the parameter reflects an improvement in the transmission quality of the signal, when the modulation amplitude increases; and
    a second behaviour such that the evolution of the value of the parameter reflects a decrease in the transmission quality of the signal, when the modulation amplitude increases.

6. The method according to claim 5, wherein said adjusting of the modulation amplitude implements at least one positive or negative increment according to whether the light-emitting diode has the first or the second behaviour.

7. The method according to claim 5, wherein an initial step of determining the first reversal value.

8. The method according to claim 7, wherein determining the first reversal value implements measurements of impedance spectra of the light-emitting diode, for different values of the DC component of the supply signal, the first reversal value separating two behaviours of the light-emitting diode:
    a first behaviour such that the radius of the impedance spectrum increases with the modulation amplitude; and
    a second behaviour such that the radius of the impedance spectrum increases when the modulation amplitude decreases.

9. The method according to claim 7, wherein determining the first reversal value implements searching for the point of intersection of several curves representing the equivalent resistance of the light-emitting diode as a function of the DC component of its supply signal.

10. The method according to claim 7, wherein determining the first reversal value implements searching for a point of inflexion on a curve representative of the logarithm of the intensity of the current flowing through the light-emitting diode as a function of a DC supply voltage.

11. An optimization module suitable for implementing a method according to claim 1, wherein said module comprises:
    an intensity controller, arranged to set the value of the DC component of the supply signal of the light-emitting diode;
    signal processing means, suitable for measuring the value of the parameter;
    control means, arranged to modify the modulation amplitude of the AC component of the supply signal of the light-emitting diode; and
    adjusting means receiving, as an input, the value of the parameter, and driving the control means to modify the modulation amplitude, so as to modify the value of the parameter for the purpose of improving the transmission quality of the signal.

12. The module according to claim 11, wherein said module further comprises means for comparing the DC component of the supply signal of the light-emitting diode with a first reversal value separating two behaviours of the light-emitting diode:
   a first behaviour such that the evolution of the value of the parameter reflects an improvement in the transmission quality of the signal, when the modulation amplitude increases; and
   a second behaviour such that the evolution of the value of the parameter reflects a decrease in the transmission quality of the signal, when the modulation amplitude increases.

13. A wireless communication system comprising a light-emitting diode forming emitting means, and a photodetector forming receiving means, said light-emitting diode being supplied with a supply signal comprising a DC component and an AC component, wherein said system further comprises an optimization module according to claim 11.

14. A method for optimizing the data rate, in a wireless communication system comprising a light-emitting diode forming emitting means, said light-emitting diode being supplied with a supply signal comprising a DC component and an AC component, wherein said method comprises the following steps:
   setting a modulation amplitude of the AC component of the supply signal; and
   adjusting the DC component of the supply signal, from a measurement of a parameter, said parameter being representative of the transmission quality of a signal, the signal corresponding to a light signal emitted by the light-emitting diode and received by a photodetector forming receiving means of the wireless communication system.

15. An optimization module suitable for implementing a method according to claim 14, wherein said module comprises:
   a modulation amplitude controller, arranged to set the modulation amplitude of the AC component of the supply signal of the light-emitting diode;
   signal processing means, suitable for measuring the value of the parameter;
   control means, arranged to modify the DC component of the supply signal of the light-emitting diode; and
   adjusting means receiving, as an input, the value of the parameter, and driving the control means to modify the DC component of the supply signal, so as to modify the value of the parameter for the purpose of improving the transmission quality of the signal.

16. A wireless communication system comprising a light-emitting diode forming emitting means, and a photodetector forming receiving means, said light-emitting diode being supplied with a supply signal comprising a DC component and an AC component, wherein said system further comprises an optimization module according to claim 15.

* * * * *